United States Patent [19]

Patino et al.

[11] Patent Number: 5,097,961
[45] Date of Patent: Mar. 24, 1992

[54] ORGANIZER AND REMINDER DEVICE FOR PAYING BILLS

[76] Inventors: Manuel A. Patino, 5881 S.W. 149th Crt., Miami, Fla. 33193; Ricardo E. Patino, 19161 N.W. 78th Ave., Miami, Fla. 33015

[21] Appl. No.: 650,172

[22] Filed: Feb. 4, 1991

[51] Int. Cl.⁵ ............................................. B42F 17/00
[52] U.S. Cl. ..................................... 211/10; 206/425; 40/124.2
[58] Field of Search ...................... 211/45, 10; 40/124, 40/124.2, 124.4; 206/449, 425

[56] References Cited

U.S. PATENT DOCUMENTS

| | | | |
|---|---|---|---|
| 2,113,804 | 4/1938 | Gronberg | 40/124.2 |
| 2,150,850 | 4/1957 | Smith | 40/124.2 |
| 2,959,879 | 11/1960 | Mazur | 40/124 X |
| 3,012,348 | 12/1961 | Smith | 40/124.2 |
| 3,782,013 | 1/1974 | Hutchison, Jr. | 40/124.2 |
| 4,419,837 | 12/1983 | Meeker | 40/124.2 X |
| 4,803,795 | 2/1989 | Questel et al. | 40/124.2 |

Primary Examiner—Carl D. Friedman
Assistant Examiner—Korie H. Chan
Attorney, Agent, or Firm—Malloy, Downey & Malloy

[57] ABSTRACT

An organizer and reminder device for organizing mail and specifically bills, in a displayed manner in accordance with a particular day of the month when each of the bills is to be paid. A display board is supported in a generally upright position with individual envelopes containing the bills being held in pockets on the display board such that at least a portion of each of the envelopes extends out from a pocket in a readily visible, displayed manner. Each of the pockets has an assigned number indicating a particular day of the month, wherein a bill placed therein is to be paid by the date indicated. A receiving tray is attached along a lower edge of the display board for placement of incoming mail therein.

7 Claims, 2 Drawing Sheets

ORGANIZER AND REMINDER DEVICE FOR PAYING BILLS

BACKGROUND OF THE INVENTION

1. Field of the Invention

A device for holding mail, and specifically bills, to organize and remind a user to pay each of the bills on a particular day of the month in accordance with the due date of each bill.

2. Description of the Related Art

The average household in today's society has a considerable amount of expenses which usually have to be paid on a monthly basis, including such expenses as mortgage payments, car payments, insurance, utilities, phone, cable t.v., and possibly many other items depending on the particular household. Most often, a bill is received for each of these expenses at least several weeks before the payment is due, and understandably, the due dates for all of these bills are usually scattered throughout/the month. Keeping track of all these different due dates so that the bills can be paid on time has proven to be a difficult, if not impossible task, for someone other than a full-time recordkeeper.

Most people keep their bills for the month in a stack or pile and try to make a mental note of the due dates for each bill Obviously, this leads to occasional late payments as it is almost impossible to remember all of the different due dates for a number of bills month after month. There are some people who are somewhat more orderly and keep track of the due dates by making notations on their calendar or in a record book. While this helps people to remember to pay their bills on time, there is still plenty of room for error. For instance, if the person fails to make one notation for a particular bill, most likely the bill will not be paid on time since the person is relying solely on the calendar notations to remind him/her to make the payment.

In view of the aforementioned, it is highly desirable to have a organizing and reminder device which can be supported in a readily visible location, wherein all of the bills to be paid in a household for a particular month can be organized and displayed in a manner which corresponds the date on which each of the bills is to be paid.

SUMMARY OF THE INVENTION

It is an object of the present invention to provide an organizer and reminder device for organizing bills in accordance with their particular due dates in such a manner so as to remind the user to make the payment on time.

It is another object of the present invention to provide an organizer and reminder device which is adapted to hold envelopes containing bills in a readily displayed manner and in accordance with a particular day of the month on which each of the bills is to be paid.

It is a further object of the present invention to provide an organizer and reminder device which includes a plurality of pocket structures each having an assigned number corresponding with a particular day of the month, wherein envelopes containing bills can be inserted and supported in a displayed manner within each of the pockets in accordance with their particular due dates.

It is still another object of the present invention to provide an organizer and reminder device which is adapted to be placed and supported in a readily visible location so that a user will be constantly reminded of the dates on which each one of a number of bills is to be paid.

It is still a further object of the present invention to provide an organizer and reminder device which is relatively simple and inexpensive to manufacture and affordable to a vast majority of the consuming public.

Briefly, in accordance with a preferred embodiment of the invention, there is provided an organizer and reminder device for organizing and reminding a user to pay his/her monthly bills before their due date, wherein the device comprises a display board generally supported in a substantially upright position against a wall surface and including a plurality of pockets on an exposed face thereof for holding a plurality of envelopes in a readily visible, displayed manner. The display board is formed of three panels, including a front panel, an intermediate panel and a rear panel. The front panel includes a plurality of slots defining the pockets, wherein each slot is structured and configured for slidable receipt of an envelope therethrough. The intermediate panel includes a cutout portion having stop surfaces formed therealong positioned and disposed in abutting, engaging relation with a lower edge of an inserted envelope such that a portion of each of the envelopes held within the pockets extends outwardly in a readily visible, displayed manner. Each of the slots has an assigned number printed on an outer surface of the display board, the assigned numbers each corresponding with a particular day of the month, wherein a bill to be paid on a particular date is inserted through a slot having an assigned number value corresponding with the due date. A receiving tray may be attached along a lower edge of the display board for holding incoming mail, including bills to be paid in the following months.

The invention accordingly comprises the features of construction, combination of elements, and arrangement of parts which will be exemplified in the construction hereinafter set forth and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
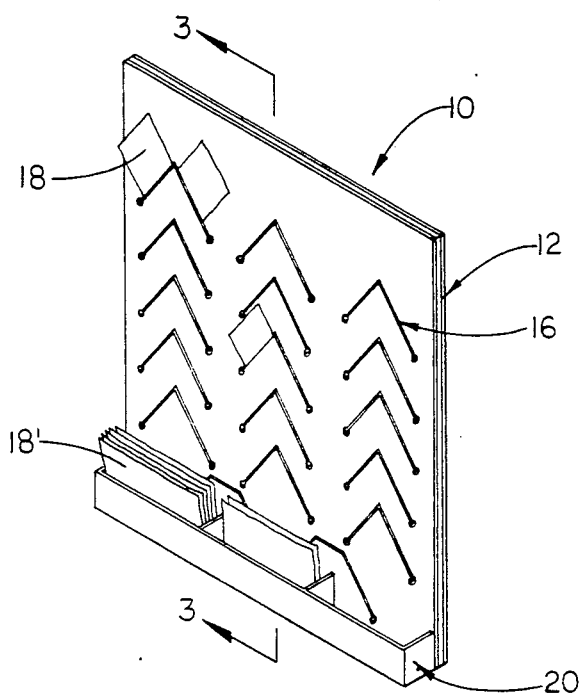
FIG. 1 is a perspective view of a preferred embodiment of the organizer device of the present invention.

Referring to the drawings and initially to FIG. 1, there is illustrated an organizer and reminder device, generally indicated as 10, for organizing bills in such a manner so as to remind a person to pay each of the bills by a particular due date.

The organizer and reminder device 10 includes a display board 12 generally supported and oriented in an upright, substantially vertical position, preferably against a flat wall surface by hook 13 in the back of the display board adapted to hang from a nail or any other conventionally known hanging hardware. A plurality of pocket structures 16 are formed in the display board 12 being specifically structured and configured to receive and hold envelopes 18 containing bills therein so that at least a portion of the envelopes 18 extends outwardly from the pocket structures 16 in a readily visible manner. The device 10 may further include a receiving tray 20 extending outwardly from a lower portion of the display board 12, the receiving tray 20 being specifically structured to hold incoming mail 18' therein. Generally, the incoming mail 18' consists of bills which are to be paid in a following month.

Figure 2:
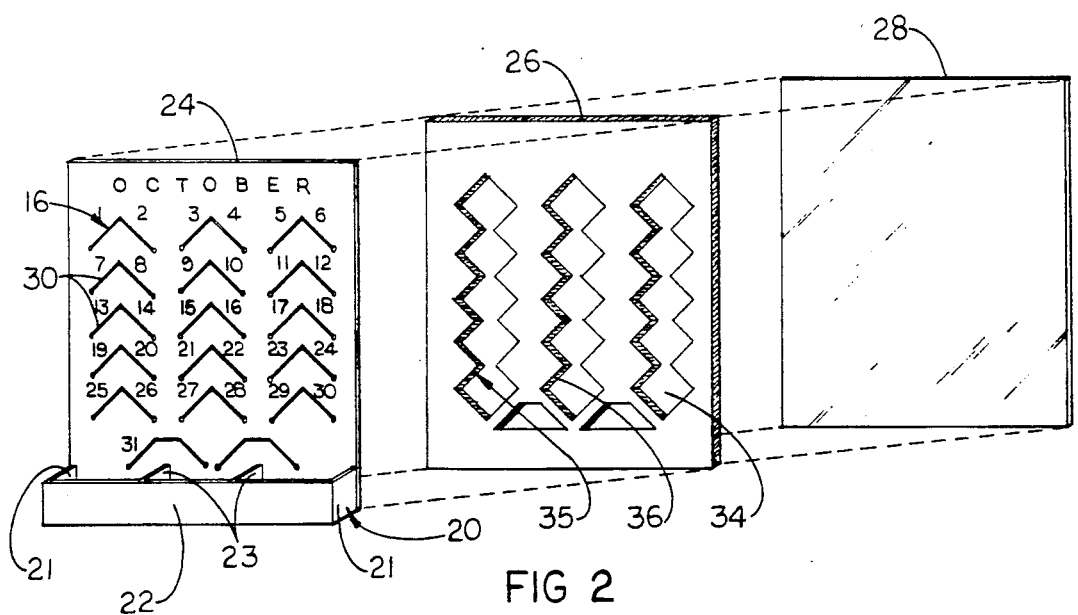
FIG. 2 is an exploded view shown in perspective illustrating the structural components of the present invention.

Referring to FIG. 2, the display board 12 is formed from a plurality of panels adhered to one another in overlying, stacked relation. Specifically, the display board 12 includes a front panel 24, an intermediate panel 26, and a rear panel 28. The front and rear panels 24, 28 are preferably formed of a 20 point cardboard or like material. The intermediate panel 26 is formed of a substantially thicker cardboard, preferably ¼ inch, having a corrugated construction.

Figure 3:
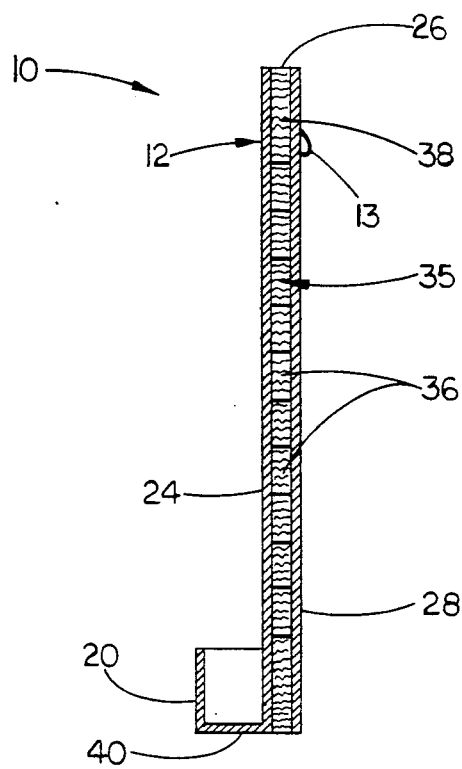
FIG. 3 is a sectional view taken along Line 3—3 of FIG. 1.

The front panel 24 includes the pocket structures 16, which are formed by a plurality of slots 30 arranged substantially throughout an entire surface thereof. Each of the slots 30 is specifically structured for slidable receipt of at least one envelope 18, as described in more detail hereinafter. The front panel 24 may also include the receiving tray 20 attached to and extending from a lower portion thereof. The receiving tray 20 includes a pair of opposite side walls 21 and 21', a front wall 22, interior dividing walls 23, and a bottom portion 40, as shown in FIGS. 2 and 3.

Figures 4, 5:
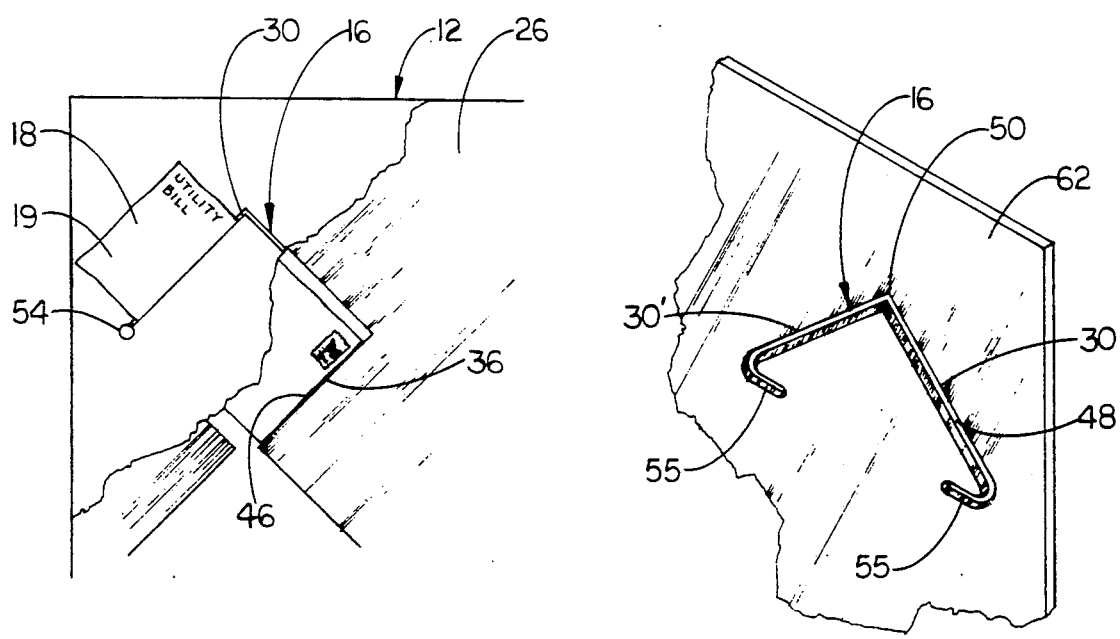
FIG. 4 is an isolated plan view showing an envelope in supported position within a pocket structure of the invention.
FIG. 5 is a cutaway view shown in perspective illustrating a pair of slots forming the pocket structure in an alternative embodiment of the present invention.

The intermediate wall 26 forms an interior skeletal structure of the display board 12 with the corrugated construction thereof providing a substantial thickness extending between the front 24 and rear 28 panels. A plurality of cutout portions 34 in the intermediate panel 26 provides for sufficient room behind each of the pocket structures 16 for insertion of the envelopes 18. The cutout portions 34 consist of overlapping diamond shapes having flat surfaces 35 disposed at angular positions about the cutout portion 34. The flat surfaces 35 are formed due to the thickness of the intermediate panel 26, as best seen in FIG. 4. Some of the flat surfaces 35 define stop surfaces 36 which are positioned in substantially parallel, spaced relation to a corresponding slot 30 when the front panel 24 is adhered in overlying relation to the intermediate panel 26. These stop surfaces 36 are positioned and disposed so as to engage a lower edge of the envelopes 18 inserted within the pocket structure 16 so that a portion of the envelope 19 extends outwardly therefrom in a visible, displayed manner.

The rear panel 28 forms a backing which prevents the inserted envelopes 18 from sliding through the cutout portions 34.

As seen in FIG. 4, a lower edge 46 of an envelope 18 inserted within a slot 30 of one of the pocket structures 16 will eventually engage in abutting relation with a stop surface 36 on the intermediate panel 26 so that the portion 19 of the envelope 18 remains exposed. Each of the pocket structures 16 is formed by a pair of slots 30, 30' interconnecting with one another at an apex 50 and extending downwardly at an angle in opposite relation to one another, as shown in FIG. 5. The slots 30 and 30' include means to prevent tearing such as a circular aperture 54 or a hooked-shaped portion 55 or any other effective means designed to prevent tearing of the slots 30, 30' when inserting and removing envelopes through the opening 48 formed between a flap portion 60 and a remainder of an exposed surface 62 of the front panel 24.

Now that the invention has been described,

What is claimed is:

1. An organizer and remainder device for holding envelopes containing bills to be paid by a particular day in a month, the device comprising:

a display board adapted to be supported in a substantially upright, vertically oriented position against a wall surface and comprising a plurality of substantially planar panels disposed in overlying, stacked relation to one another including a front panel, an intermediate panel, and a rear panel, pocket means formed in said display board for holding the envelopes therein, said pocket means including a plurality of slots in said front panel, each of said slots being structured and configured for receipt of at least one of the envelopes therethrough, said plurality of slots including means to prevent tearing thereof when inserting and removing the envelopes therein, said pocket means further including stop means structured to engage a lower, inserted edge of the envelopes such that at least a portion of each of the envelopes extends outwardly from said slots in a displayed orientation, said stopping means including cutout portions in said intermediate panel having a plurality of angularly disposed stop surfaces about said cutout portions defined by the thickness of said intermediate panel, wherein at least some of said stop surfaces are positioned in parallel, spaced relation from a corresponding one of said slots so that the lower inserted edge of the envelope will engage a stop surface in abutting, supporting relation therewith, indicia on an outer exposed surface of said front panel including a plurality of numerals identifying each of said plurality of slots as particular days of the month, and a receiving tray rigidly attached to and extending outwardly from a lower edge of the display board adjacent to the front panel, said receiving tray being structured and disposed for containing envelopes therein.

2. A device as in claim 1 wherein said intermediate panel includes a corrugated construction having a greater thickness than said front panel and said rear panel.

3. A device as in claim 2 wherein said plurality of panels are adhered to one another in overlying, stacked relation so as to form a one-piece structure, preventing relative movement therebetween.

4. A device as in claim 3 wherein said plurality of slots are disposed in an angular orientation in said front panel being arranged in pairs, wherein each pair includes two slots interconnecting at an apex and extending downwardly at angle in opposite relation to one another.

5. A device as in claim 4 wherein said receiving tray includes a bottom portion and a surrounding wall structure including a front wall and two opposite side walls disposed in surrounding relation to a holding compartment for holding incoming mail.

6. A device as in claim 5 wherein said support tray further includes a plurality of interior dividing walls positioned and disposed so as to form a plurality of holding compartments.

7. An organizer and reminder device for holding envelopes containing bills to be paid by a particular day in a month, the device comprising:

a display board adapted to be supported in a substantially upright, vertically oriented position against a wall surface and comprising a plurality of substantially planar panels disposed in overlying, stacked relation to one another including a front panel, an intermediate panel, and a rear panel, pocket means formed in said display board for holding the envelopes therein, said pocket means including a plurality of slots in said front panel, each of said slots being structured and configured for receipt of at least one of the envelopes therethrough, said plurality of slots including means to prevent tearing thereof when inserting and removing the envelopes therein, said pocket means further including stop means structured to engage a lower, inserted edge of the envelopes such that at least a portion of each of the envelopes extends outwardly from said slots in a displayed orientation, said stopping means including cutout portions in said intermediate panel having a plurality of angularly disposed stop surfaces about said cutout portions defined by the thickness of said intermediate panel, wherein at least some of said stop surfaces are positioned in parallel, spaced relation from a corresponding one of said slots so that the lower inserted edge of the envelope will engage a stop surface in abutting, supporting relation therewith, and indicia on an outer exposed surface of said front panel including a plurality of numerals identifying each of said plurality of slots as particular days of the month.

* * * * *